United States Patent
Chandraghatgi et al.

(10) Patent No.: US 9,262,518 B2
(45) Date of Patent: Feb. 16, 2016

(54) DYNAMICALLY DETERMINING THE RELATEDNESS OF WEB OBJECTS

(75) Inventors: Prateeksha Uday Chandraghatgi, Bangalore (IN); Subhajit Sanyal, Bangalore (IN); Sriram J. Sathish, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 181 days.

(21) Appl. No.: 13/100,302

(22) Filed: May 4, 2011

(65) Prior Publication Data
US 2012/0284266 A1 Nov. 8, 2012

(51) Int. Cl.
*G06F 17/30* (2006.01)

(52) U.S. Cl.
CPC ...... *G06F 17/3071* (2013.01); *G06F 17/30864* (2013.01)

(58) Field of Classification Search
CPC .............. G06F 17/30867; G06F 17/30864; G06F 17/30554; G06F 17/30557
See application file for complete search history.

(56) References Cited

U.S. PATENT DOCUMENTS

| | | | |
|---|---|---|---|
| 7,966,225 B2 * | 6/2011 | Chan et al. | G06F 17/30522 705/26.7 |
| 7,970,240 B1 * | 6/2011 | Chao et al. | 382/305 |
| 8,433,588 B2 * | 4/2013 | Willis et al. | 705/4 |
| 2003/0001880 A1 * | 1/2003 | Holtz et al. | 345/716 |
| 2006/0242126 A1 * | 10/2006 | Fitzhugh | G06F 17/30058 |
| 2007/0179944 A1 * | 8/2007 | Van Dyke Parunak et al. | 707/5 |
| 2008/0127270 A1 * | 5/2008 | Shipman et al. | 725/46 |
| 2008/0243817 A1 * | 10/2008 | Chan | G06F 17/30867 |
| 2009/0094525 A1 * | 4/2009 | Coelius et al. | 715/741 |
| 2010/0223078 A1 * | 9/2010 | Willis et al. | 705/4 |
| 2010/0293221 A1 * | 11/2010 | Sidman et al. | 709/203 |
| 2011/0010641 A1 * | 1/2011 | Wolff et al. | 715/753 |
| 2011/0161419 A1 * | 6/2011 | Chunilal | 709/204 |
| 2011/0202528 A1 * | 8/2011 | Deolalikar et al. | 707/737 |
| 2011/0208822 A1 * | 8/2011 | Rathod | 709/206 |
| 2011/0276396 A1 * | 11/2011 | Rathod | 705/14.49 |
| 2012/0221967 A1 * | 8/2012 | Kwan | 715/763 |

* cited by examiner

*Primary Examiner* — Angelica Ruiz
(74) *Attorney, Agent, or Firm* — James J. DeCarlo; Greenberg Traurig, LLP

(57) ABSTRACT

A first cluster of web objects is identified from a click-through data structure. The click-through data structure can organize web objects into clusters based on query results of web objects selected by a user. Also, a second cluster of web objects can be identified from a metadata data structure. The metadata data structure can organize web objects into clusters based on metadata associated with the web objects. An output set of web objects is selected, in real time, from the identifier clusters.

18 Claims, 7 Drawing Sheets

DYNAMICALLY DETERMINING THE RELATEDNESS OF WEB OBJECTS

BACKGROUND

1. Technical Field

Embodiments of the invention relate generally to web objects, and more specifically, dynamically determining the relatedness of web objects to a new web object.

2. Prior Art

The vast amount of information available on the Internet gives rise to the need for effective techniques for web searching. Search engines provide one mechanism for indexing web information and allowing users to retrieve results with a search query. However, queries can be interpretive due to idiosyncrasies in language such as double meanings. For example, a query for 'Paris' could return results for both the city of Paris and the celebrity Paris Hilton.

One complement to search results based on the search query is suggested results. These suggestions are based on the search results themselves, or even a specific search result that is selected by a user. Once a result has been selected, suggestions that are similar to the selected result are presented. Returning to the example, if Paris Hilton is selected from the results, suggestions provide additional results related to Paris Hilton and to other characteristics of the selected query result. For example, if the selected result concerns a movie starring Paris Hilton, the suggestions may include other Paris Hilton movies.

Problematically, when web objects, such as movies, images or documents, are initially made available on the Internet, conventional techniques have difficulty in finding related web objects to present as suggestions. Whereas web pages are easily described by text, many web objects do not include text, making indexing and searching more difficult. Although various parameters about web objects develop over time, such as user comments and click-throughs, this data may not be available for newer web objects. Also, databases that index web objects are often updated offline or in batch. Thus, web objects that have yet to be indexed present difficulties when presenting suggestions of related web objects.

In the light of the foregoing discussion, there is a need for a technique to dynamically identify web objects related to a relatively new web object.

SUMMARY

The above-mentioned needs are met by a method, a computer program product and a system for dynamically identifying web objects related to new web objects.

In one embodiment, a first cluster of web objects is identified from a click-through data structure. The click-through data structure can organize web objects into clusters based on query results of web objects selected by a user. Also, a second cluster of web objects can be identified from a metadata data structure. The metadata data structure can organize web objects into clusters based on metadata associated with the web objects. An output set of web objects is selected, in real time, from the identifier clusters.

A web object can comprise a video, an image, a document, or any other suitable web component. In one example, a set of related videos are suggested for a user that selects a video from search results.

Advantageously, a robust selection of related web objects can be suggested for newly added web objects.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

The above-mentioned needs are met by a method, computer program product and system for dynamically identifying web objects related to a newly added web objects. For example, when a recently published image is selected, a robust set of suggested images can also be presented to the user. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
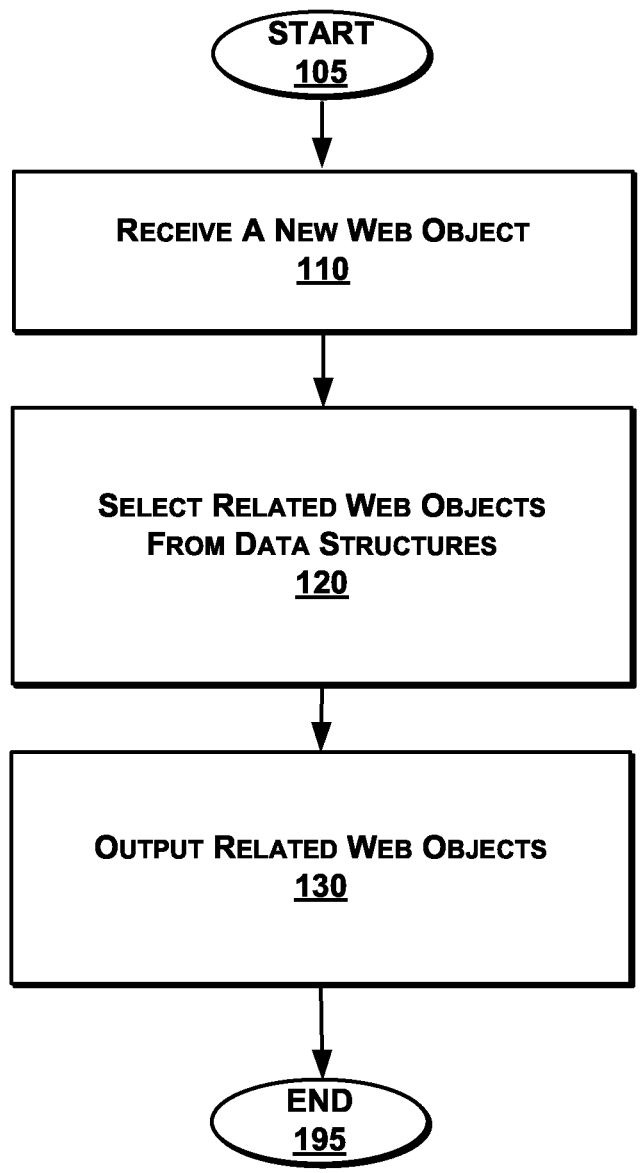
FIG. 1 is a high-level flow chart illustrating a method for dynamically determining web objects related to a new web object according to an embodiment.

FIG. 1 is a high-level flow chart illustrating a method for dynamically determining web objects related to a new web object according to an embodiment.

At step 110, a new web object is received. Generally, a web object is an element of a web page such as an image, a document or a video (or viewer for an image, document or video). In some embodiments, a web object includes a group of web objects. Web objects can have properties that describe behaviors such as a response to a roll over, hover, or click. Additionally, web objects can be sized, formatted, and manipulated in various ways. Web objects can be embedded in a web page and managed using source code such as HTML or auxiliary software such as Java or Flash.

A new web object includes web objects that have been recently made available by publication to the Internet or otherwise, and have yet to be processed into existing data structures. As a result, new web objects, in some embodiments, have relatively little or no information about relatedness to exiting web objects. Tools such as web crawlers and data scrapers update databases and indexes from time to time during a batch process, thereby adding the new web objet to existing data structures.

For example, frequently updated web sites such as Yahoo! Video constantly receive video uploads. When a video is first uploaded, a data structure that describes a relation between videos has yet to be updated to include the new video, and thus, has no inherent way to identify related videos. Once processing has occurred, the data structure can be walked to find related videos. The above example is described with more detail below with respect to FIG. 3.

At step 120, a related web objects are selected from data structures, as described below with respect to FIG. 2. In one embodiment, related web objects are selected in substantially real time. For example, related objects can be identified while a video is being uploaded. In another embodiment, the related web objects can be updated from time to time, or on demand when new information is gathered. Various types of data structures can be used to relate web objects to each other. Relatedness to web objects of the data structures can be determined by one or many data structures.

In one embodiment, data structures are processed in batch while a server is offline or during low-traffic periods. Some servers are less busy during late night hours, or the server may go offline temporarily. During this time, newly added web objects can be added to a data structure. Once the server returns to a live status, new objects can be cached until the next batch processing.

At step 130, related web objects are output. The specific type of output is implementation specific. In one example, the output suggestions of related objects. The related objects can be objects related to search results returned from a search engine (either a general search engine such as Yahoo! Search or an internal search engine such as within YouTube). In another example, the output can be display of an advertisement object. The advertisement object can be related to another object such as an image object.

Figure 2:
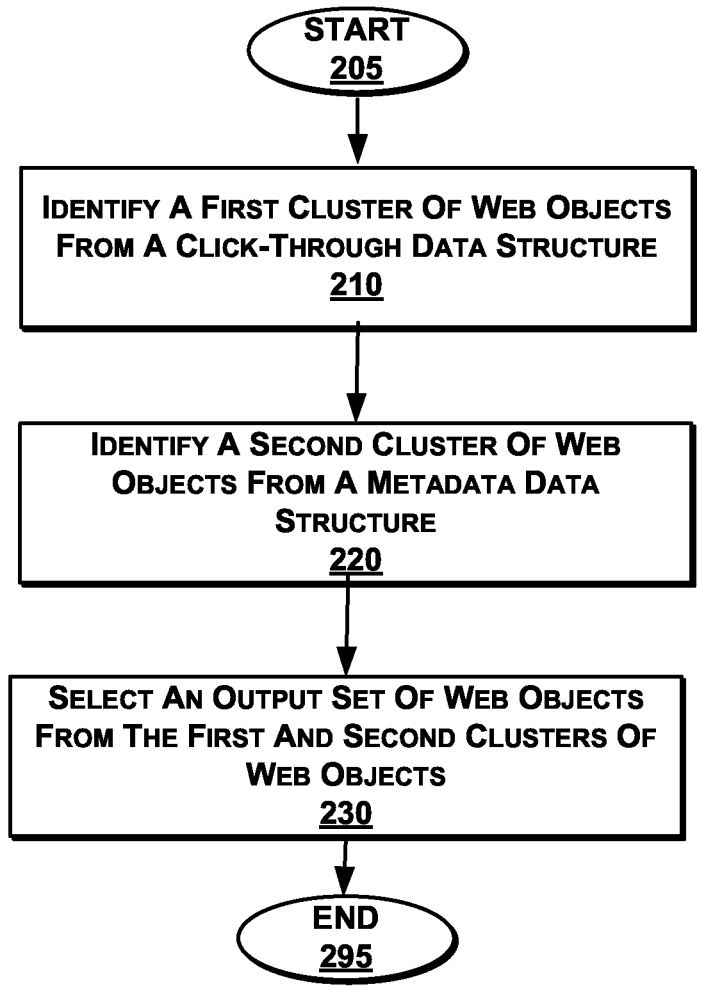
FIG. 2 is a detailed flow chart illustrating a method for dynamically determining web objects related to a new web object according to an embodiment.

FIG. 2 is a more detailed flow chart illustrating an exemplary detailed method 120 for dynamically determining web objects related to a new web object according to an embodiment. By dynamically determining relatedness, no history is required for finding objects related to a subject object, for example a new object. Instead, click-throughs and metadata within an existing data structure puts the new object into context. In other words, off-line data structures can be leveraged to determine the relatedness of the new object in real-time.

At step 210, a first cluster of web objects is identified from a click-through data structure and can be generated in an off-line process. In one embodiment, a click-through data structure describes the relatedness between a group of web objects. Object-to-object relatedness can be shown in the form of a matrix where each object has either a zero or a non-zero relatedness to each other object with respect to a query. The zero relatedness refers to when query results are returned to users, there are no instances of users selecting at least one of the objects from the results. On the other hand, the non-zero relatedness refers to when query results are returned to users, there are instances in which users are selecting a first web object, and there are also instances in which the users are selecting a second web object. The frequency of selections is represented by a relatedness value. For example, the top two query results selected by users will have the highest relatedness value.

Web objects having a non-zero relatedness value are added to a cluster. In one embodiment, a threshold defines a minimum for relatedness value of clustered objects. There are at least two, but possibly many more objects per cluster. Individual web objects can be part of more than one cluster.

Thus, a resultant static click-through data structure includes a group of clusters. Each cluster is representative of a search query and includes a group of related web objects.

At step 220, a second cluster of web objects is identified from a metadata data structure and can also be generated in an off-line process. Generally, metadata associated with a web object provides some type of description. For example, a web user can make a comment or give a rating. Additionally, metadata can include properties such as category, file type, length or size. Metadata relatedness can be shown in the form of a matrix with non-zero and zero values.

A metadata structure can include clusters of web objects. Each cluster can represent, for example, terms from the metadata and include web objects having the same or similar terms. As described above, a threshold can be set for the relatedness of clustered objects.

In one implementation, words associated with the metadata can be tokenized. Next, clusters associated with the word can be identified (i.e., identify a cluster given a word). Next, web objects from a cluster are identified (i.e., identify web objects given a cluster).

In one embodiment, metadata similarity between two objects can be quantified using a cosine similarity metric. As such, a graph data structure wherein each object is a unique node in a graph and two nodes are connected by an edge with an edge weight, represents the metadata similarity between the two corresponding objects. To simplify computation, edges can be discarded.

In another embodiment, a Hadoop framework is used to compute graph data in a distributed setting. The Hadoop framework allows the computation process to be simplified, for example, from a corpus of hundreds of millions.

In one embodiment, a distributed version of the Markov Clustering Algorithm can be used to cluster videos. Resultant clusters can be referred to as static-metadata clusters. Subsequently, to find related objects, a list of other videos in a cluster in descending order of their cosine similarity to a subject (e.g., a new) object can be obtained.

At step 230, an output set of web objects is selected from the first and second clusters of web objects. In some embodiments, a predetermined number of web objects having the highest relatedness are selected. In other embodiments, prior to selecting, relatedness values of different matrices are normalized to a common scale. Then, the top web objects are selected in accordance with the specific implementation.

In one implementation, a relatedness value is calculated for each related web object using the below formula:

$$\sum_w P(w) * F(w) * P(C \mid w) * P(d \mid C)$$

Further, a score is calculated for click-through related videos using the below formula:

$$\sum_w P(w) * F(w) * P(C \mid w) * P(d \mid C) * P(d\_c \mid d)$$

The terms can be defined as:

P(w): A word which is a part of a large number of clusters is considered ambiguous and hence its weight is low. But, a word which belongs to a small number of clusters is considered to be a specific word and its weight is high. This quantity is normalized such that P(w) when summed over all the words is unity.

F(w): frequency of a term in metadata of a web object.

P(C|w): For each term/word, an ordered list of metadata clusters with a score. This quantity represents the most likely cluster given a word w. This is normalized such that the quantity P(C|w), for a word w when summed over all the clusters is unity.

P(w|C): For each cluster, the list of significant terms with a score. This gives us the list of significant words in cluster and its weight is proportional to the number of documents in the cluster containing the word. This is normalized such that P(w|C) for a cluster, when summed over all the words is unity.

P(d|C): For each cluster, an ordered list of documents and their scores. This quantity represents how strongly each document belongs to the cluster. This quantity signifies how strongly each document is associated with each cluster. Amongst various alternatives, convergence values from the MCL algorithm as P(d|C) are considered.

P(d_c|d): For each document d, an ordered list of documents d_c that are related to it, extracted from the click clusters. Each related document is associated with a score obtained from the random walk formulation.

Various implementation-specific calculations can be substituted as the above is given only for purposes of illustration.

In one implementation, for each new object, the following steps can occur. First, metadata of the document is tokenized and filtered by P(w). P(C|w) is looked-up and all metadata clusters (set C) is extracted for most significant worlds (top N) in the metadata (set W). Next, for each of the clusters in C, a significant list of terms from P(w|C) is retrieved and weighted cosine distance is calculated for the set with W. This gives a better estimate of the relatedness of that cluster to the object. Afterwards, P(d|C) is looked-up and objects for the top K clusters in C are extracted. P(d_c|d) is then looked-up and the top U objects from the pool are extracted and added. Finally, a score is calculated for each object, using, for example, the above-mentioned formulas.

Figure 3:
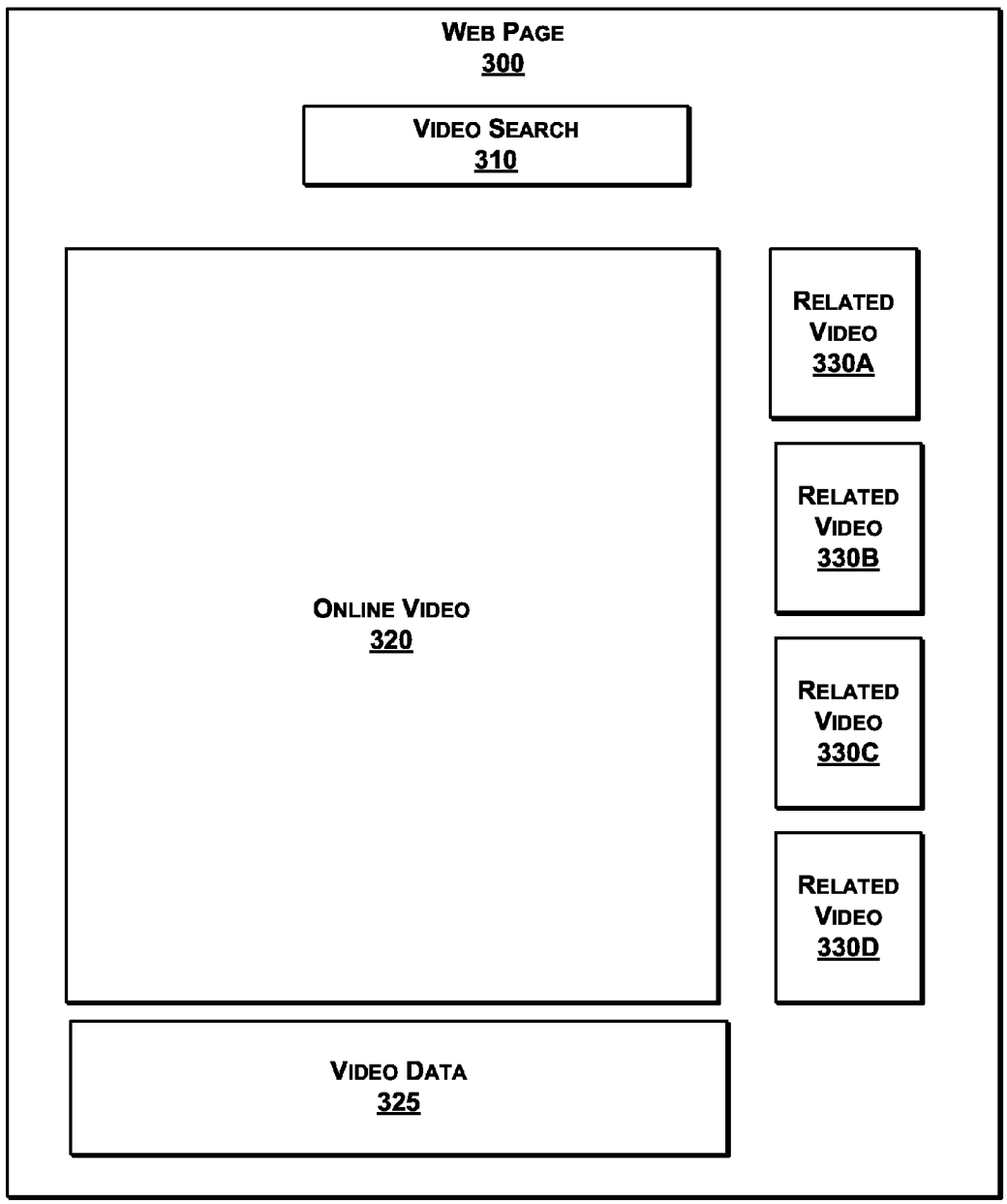
FIG. 3 is a schematic diagram illustrating a web page with related web objects according to another embodiment.

FIG. 3 is a schematic diagram illustrating a web page 300 with related web objects according to another embodiment. The web page 300 includes a video search 310, an online video 320, and related videos 330A-D.

The web page 300 can be any Internet or local page displaying newly added web objects and related web objects. For example, Yahoo! Video and YouTube are web sites that display an online video 320 while also displaying related or suggested videos 330A-D. In other embodiments, the web page 300 can be sourced from a search engine, a shopping web site, or any other type of web site. The web page 300 can be composed using source code from HTML, XML, Java, Javascript, Flash, or the like. The web page 300 can be displayed in a web browser application or any other suitable application. In some embodiments, the web page is formatted for full display, and in other embodiments, the web page is formatted for display on a mobile device.

The video search 310 can be a text box that allows a user to enter a search query. The query can be any terms that describe a desired video. In response, one embodiment returns a list of videos with thumbnails. A user selects one of the search results to see a video.

The online video 320 can be a web object using, for example, an online video player and video content. The online video player can be a Flash player, a Windows Media application. The online video player can provide controls for the user. In some embodiments, the online video 320 is a newly added web object, for example, when recently uploaded or published.

Video data 325 can be publisher added or user added information about the online video 320. For example, a publisher can add a description about the video along with when and where it was filmed or released. Users that view the video can add comments or feedback about the online video 320. Other type of information is possible, such as computer-generated data showing properties of the video. In one embodiment, the video data 325 is used as metadata to find related videos.

Related videos 330A-D, in one embodiment, are web objects related to the online video 320. When the online video 320 is a newly added object, the techniques described above can be employed to select videos.

Figure 4:
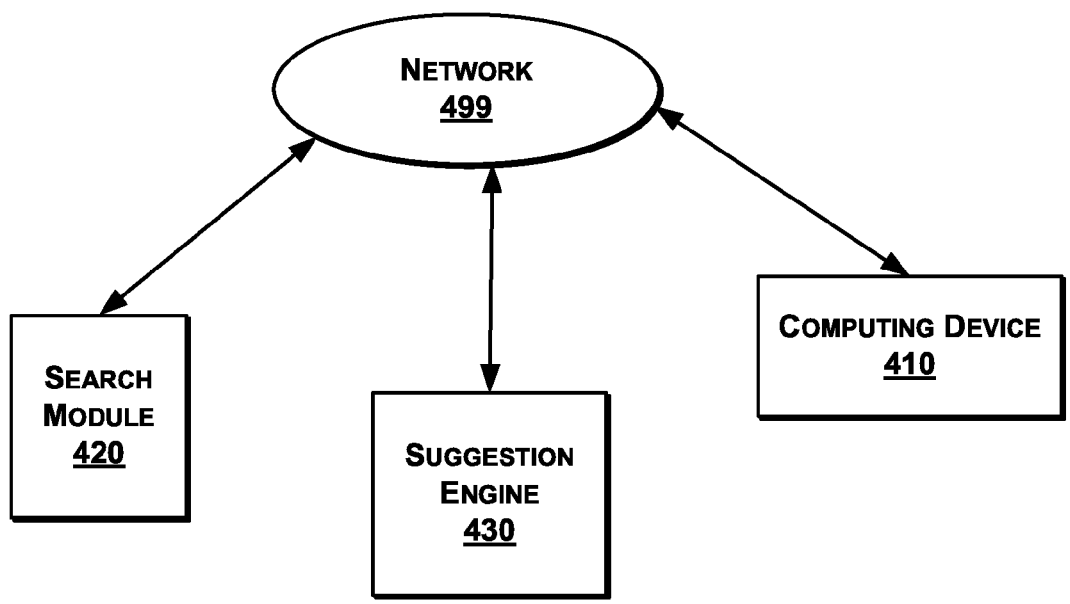
FIG. 4 is a block diagram illustrating a system for dynamically determining web objects related to a new web object according to an embodiment.

FIG. 4 is a block diagram illustrating a system for dynamically determining web objects related to a new web object according to an embodiment. The system 400 includes a computing device 410, an ad server 420, and a suggestion engine 430, coupled in communication through a network 499 (e.g., the Internet, a LAN, a WAN, a cellular network or any combination).

The computing device 410 can be, for example, a PC, a stationary computing device, a laptop or notebook computer, a tablet computer, a smart phone or PDA, a smart appliance, a video gaming console, an Internet television, a set-top box, or any other suitable processor-based device. There can be numerous computing devices 410 used by different users. In one embodiment, the computing device 410 allows a user to query search engines and view results pages that include advertisements. Additional embodiments of the computing device 410 are described in more detail below.

The ad server 420 can be one or more of any of the above processing-based devices. In one embodiment, the ad server 420 serves first and second advertisements as described herein.

The suggestion engine 430 can be any of the above processing-based devices. In one embodiment, the suggestion engine 430 provides search results responsive to queries. Further, the suggestion engine 430 communicates with the ad server 420 to request and receive advertisements for display with search results. In some embodiments, the ad server 420 and the suggestion engine 430 are hosted on a single device.

Figure 5:
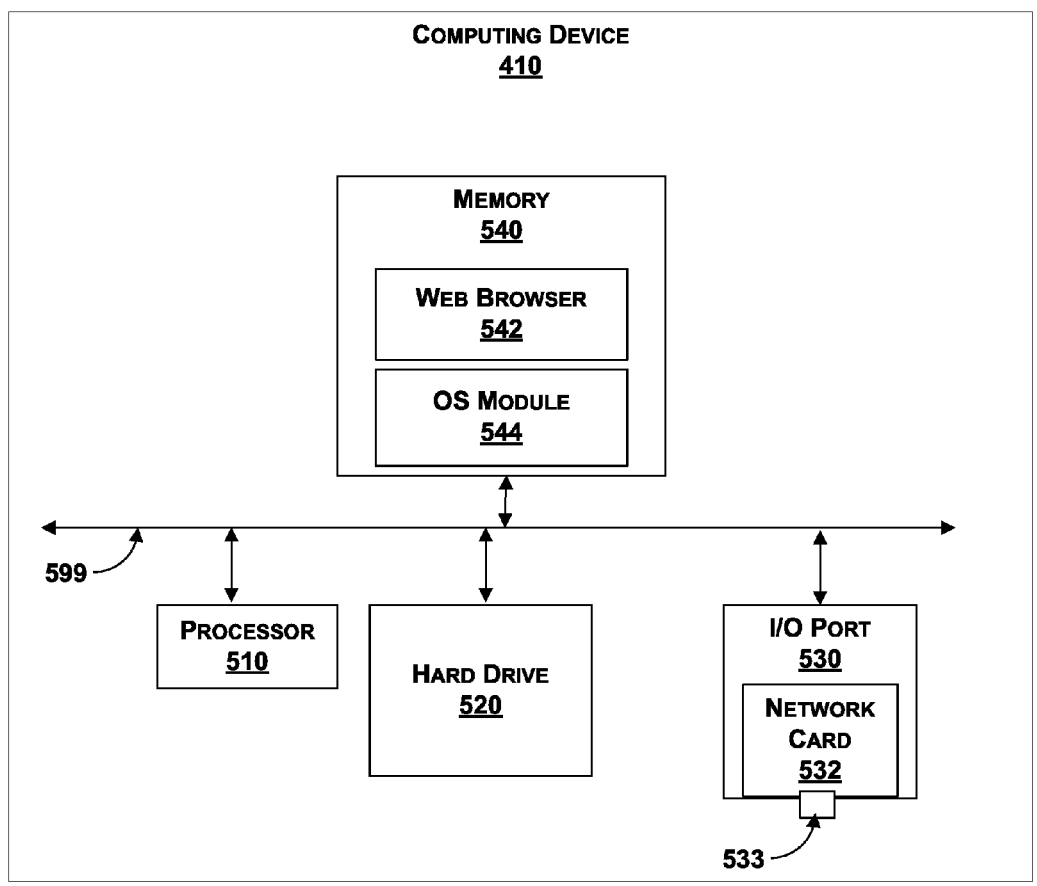
FIG. 5 is a block diagram illustrating a computing device according to an embodiment.

FIG. 5 is a block diagram illustrating a computing device according to an embodiment. The computing device 410 includes a processor 510, a hard drive 520, an I/O port 530, and a memory 540 coupled by a bus 599.

The bus 599 can be soldered to one or more motherboards. The processor 510 can be a general purpose processor, an application-specific integrated circuit (ASIC), an FPGA (Field Programmable Gate Array), a RISC (Reduced Instruction Set Controller) processor, an integrated circuit, or the like. There can be a single core, multiple cores, or more than one processor. In one embodiment, the processor 510 is specially suited for the processing demands of photograph sharing (e.g., custom micro-code, instruction fetching, pipelining or cache sizes). The processor 510 can be disposed on silicon or any other suitable material. In operation, the processor 510 can receive and execute instructions and data stored in the memory 540 or the hard drive 520. The hard drive 520 can be a platter-based storage device, a flash drive, an external drive, a persistent memory device, or any other type of memory.

The hard drive 520 provides persistent (i.e., long term) storage for instructions and data. The I/O port 520 is an input/output panel including a network card 522. The network card 522 can be, for example, a wired networking card (e.g., a USB card, or an IEEE 802.3 card), a wireless networking card (e.g., an IEEE 802.11 card, or a Bluetooth card), a cellular networking card (e.g., a 3G card). An interface 523 is configured according to networking compatibility. For example, a wired networking card includes a physical port to plug in a cord, and a wireless networking card includes an antennae. The network card 522 provides access to a communication channel on a network.

The memory 540 can be a RAM (Random Access Memory), a flash memory, a non-persistent memory device, or any other device capable of storing program instructions being executed. The memory 540 further comprises an ad serve client 541, a web browser 542, and an OS (operating system) module 544.

The ad serve client 541 can be a daemon running as a background process, a module within the web browser 542, a Java application, or the like. In one embodiment, the ad serve client 541 communicates with the ad server 420 to request and receive advertisements. The ad server 420 can also be configured to capture user actions and inform the ad server 420. In another embodiment, the ad server 420 manages display of the first and second advertisements, including detecting activation of a second portion of the second advertisement.

The web browser 542 can be a desktop web browser (e.g., Internet Explorer, Mozilla, or Chrome), a mobile browser, or a web viewer built integrated into an application program. In an embodiment, a user accesses a system on the World Wide Web (WWW) through a network such as the Internet. The web browser 542 is used to download web pages or other content in various formats including HTML, XML, text, PDF, and postscript, and may be used to upload information to other parts of the system. The web browser 642 may use URLs to identify resources on the web and HTTP (HyperText Transfer Protocol) in transferring files on the web. In one embodiment, the web browser 542 provides a user interface for viewing web pages.

The OS module 544 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

Figure 6:
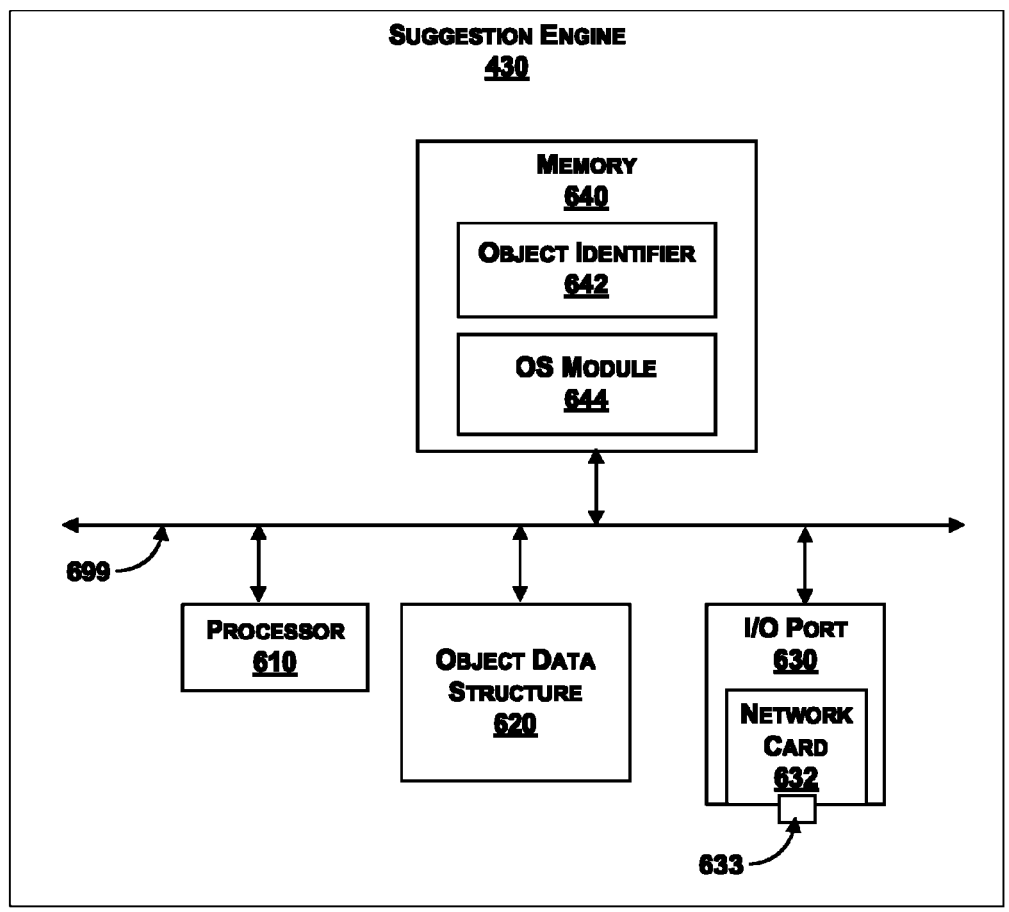
FIG. 6 is a block diagram illustrating a suggestion engine according to an embodiment.

FIG. 6 is a block diagram illustrating a suggestion engine according to an embodiment. The suggestion engine 430 includes a processor 610, an ad database 620, an I/O port 630, and a memory 640, coupled by a bus 699. The processor 610, a hard drive 620, and the I/O port 630 can be configured as described above with respect to FIG. 5. The object data structure 620, in one embodiment, stores data structures such as the click-through data structure and the metadata structure described above.

The memory 640 comprises an OS module 644, as described above, along with an object identifier 642. The object identifier 642, in one embodiment, communicates with the computing device 410 to provide objects related to a new object. The object identifier 642 is described in more detail below.

Figure 7:
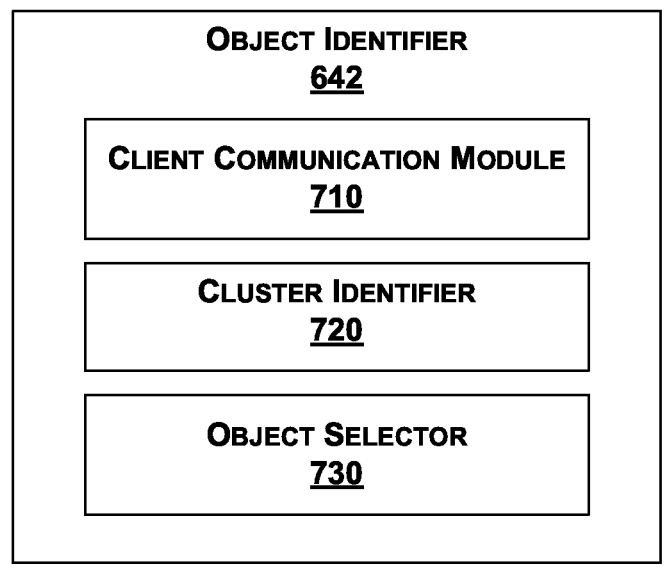
FIG. 7 is a block diagram illustrating an object identifier according to an embodiment.

FIG. 7 is a block diagram illustrating an object identifier 642 according to an embodiment. The object identifier 642 includes a client communication module 710, a cluster identifier 720 and an object selector 730. The components can communicate with each other through, for example, APIs (Application Programming Interfaces). In other embodiments, all or parts of the components can be implemented in hardware or benefit from special hardware accelerators.

In one embodiment, the client communication module 710 sends and receives information from the computing device 410 of FIG. 4 using APIs transported within network packets. The cluster identifier 720 finds clusters within the data structures that contain web objects related to a newly added web object. The object selector 730 chooses web objects from the identified clusters for output.

As described herein, computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). Many of the functionalities described herein can be implemented in computer software, computer hardware, or a combination.

Furthermore, the computer that is running the previously mentioned computer software may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
    receiving, by a processor, a new web object, the new web object having properties that describe behaviors of response to a roll over, hover, and click, the web object being sizable, formattable, and manipulable, the web object being manageable using one of source code and auxiliary software, the web object comprising at least one of a video or an image;
    identifying, by the processor, a first cluster of web objects from a first data structure comprising web objects that are organized into clusters based on a click-through relatedness;
    identifying, by the processor, a second cluster of web objects from a second data structure comprising web objects that are organized into clusters based on a metadata relatedness; and
    selecting, in real time, by the processor, an output set of web objects related to the new web object from the first and second clusters of web objects.

2. The method of claim 1, wherein the web objects comprise at least one of a video, an image, or a document.

3. The method of claim 1, further comprising:
    generating clusters from a plurality of web objects, each cluster based on a relatedness of a set of web objects, the relatedness being a value representing frequency of selections and similarity of metadata terms, the similarity being quantified using a cosine similarity metric.

4. The method of claim 1, further comprising:
    adding the new web object to the first and second data structures during batch processing.

5. The method of claim 1, further comprising:
    identifying one or more clusters based on metadata associated with the new web object, the metadata having been tokenized and filtered; and
    calculating a relatedness between the new web object and the one or more clusters using a weighted cosine distance, the relatedness comparing metadata of the new web object against metadata of the one or more clusters.

6. The method of claim 5, wherein the one or more clusters includes the first set of web objects based on a click-through relatedness.

7. The method of claim 5, wherein the one or more clusters includes the second set of web objects based on metadata relatedness.

8. The method of claim 5, wherein the metadata comprises at least one of a search term or a description of the new web object.

9. A non-transitory computer-readable storage medium that when executed by a processor, performs a method comprising:
    receiving, by the processor, a new web object, the new web object having properties that describe behaviors of response to a roll over, hover, and click, the web object being sizable, formattable, and manipulable, the web object being manageable using one of source code and auxiliary software, the web object comprising at least one of a video or an image;
    identifying, by the processor, a first cluster of web objects from a first data structure comprising web objects that are organized into clusters based on a click-through relatedness;
    identifying, by the processor, a second cluster of web objects from a second data structure comprising web objects that are organized into clusters based on a metadata relatedness; and
    selecting, in real time, by the processor, an output set of web objects related to the new web object from the first and second clusters of web objects.

10. The medium of claim 9, wherein the web objects comprises at least one of a video, an image, or a document.

11. The medium of claim 9, further comprising:
    generating clusters from a plurality of web objects, each cluster based on a relatedness of a set of web objects.

12. The medium of claim 9, further comprising:
    adding the web object to the first and second data structures during batch processing.

13. The medium of claim 9, further comprising:
    identifying one or more clusters based on metadata associated with the new web object, the metadata having been tokenized and filtered; and
    calculating a relatedness between the new web object and the one or more clusters using a weighted cosine distance, the relatedness comparing metadata of the new web object against metadata of the one or more clusters.

14. The medium of claim 13, wherein the one or more clusters includes the first set of web objects based on a click-through relatedness.

15. The medium of claim 13, wherein the one or more clusters includes the second set of web objects based on a metadata relatedness.

16. The medium of claim 13, wherein the metadata comprises at least one of a search term or a description of the new web object.

17. A system comprising:
    a processor;
    a memory;
    a client communication module, executed by the processor and stored in the memory, to receive an indication of a new web object, the new web object having properties that describe behaviors of response to a roll over, hover, and click, the web object being sizable, formattable, and manipulable, the web object being manageable using one of source code and auxiliary software, the web object comprising at least one of a video or an image;
    a cluster identifier, executed by the processor, stored in the memory, and communicatively coupled to the client communication module, the cluster identifier identifying a first cluster of web objects from a first data structure stored in a database and comprising web objects that are organized into clusters based on a click-through relatedness, the cluster identifier identifying a second cluster of web objects from a second data structure stored in the database and comprising web objects that are organized into clusters based on metadata relatedness; and
    an object selector, executed by the processor, stored in the memory, and communicatively coupled to the cluster identifier, the object selector selecting in real time an output set of web objects related to the new web object from the first and second clusters of web objects.

18. The system of claim 17:
- wherein the cluster identifier identifies one or more clusters based on metadata associated with the new web object, the metadata having been tokenized and filtered; and
- wherein a relatedness is calculated between the new web object and the one or more clusters using a weighted cosine distance, the relatedness comparing metadata of the new web object against metadata of the one or more clusters.

\* \* \* \* \*